United States Patent [19]

Kuga

[11] 3,890,123
[45] June 17, 1975

[54] MIST SEPARATOR

[75] Inventor: Atsushi Kuga, Kasukabe, Japan

[73] Assignee: Shoketsu Kinzoku Kogyo Kabushiki Kaisha, Japan

[22] Filed: Dec. 6, 1973

[21] Appl. No.: 422,340

Related U.S. Application Data

[63] Continuation of Ser. No. 189,344, Oct. 14, 1971, abandoned.

[30] Foreign Application Priority Data

May 19, 1969  Japan.............................. 44-45265
Sept. 25, 1969 Japan.............................. 44-75831

[52] U.S. Cl. ...................... 55/318; 55/486; 55/527; 55/DIG. 16; 210/315
[51] Int. Cl. ............................................ B01d 39/08
[58] Field of Search ............ 55/330, 332, 334, 318, 55/323, 482, 486, 487, DIG. 16, 527; 210/315

[56] References Cited
UNITED STATES PATENTS

| | | | |
|---|---|---|---|
| 2,442,696 | 6/1948 | Krieck .............................. | 55/330 X |
| 2,528,539 | 11/1950 | Norgren et al..................... | 55/330 X |
| 2,780,306 | 2/1957 | Boyle et al........................ | 55/522 X |
| 2,784,132 | 3/1957 | Maisel.............................. | 55/522 X |
| 3,353,339 | 11/1967 | Walter.............................. | 55/482 X |
| 3,527,027 | 9/1970 | Knight et al...................... | 55/487 X |
| 3,708,965 | 1/1973 | Domnick .......................... | 55/527 X |

*Primary Examiner*—Frank W. Lutter
*Assistant Examiner*—William Cuchlinski, Jr.
*Attorney, Agent, or Firm*—Toren and McGeady

[57] ABSTRACT

A mist separator comprising a fine fiber layer or particle layer formed by overlapping single fibers equivalent to or smaller than fine particles contained in gases and imparting hydrophilic property and affinity for oil to said layer based on capillary condensation, thereby to form fine liquid particles into large drops by forcing them to adhere to the fiber layer continuously and the final layer filter medium of a filter element constructed of multilayer media is extended downward from an outer cylinder, as shown in the accompanying drawing, to increase the area of the gas outlet of said filter element by the amount corresponding to the area of the lateral side surface of the extended medium in addition to the forward front area thereof, thus preventing liquid drops splashed from being carried away by the gas flow when liquid drops are to be separated from the final filter medium into a drain trap.

5 Claims, 4 Drawing Figures

INVENTOR
ATSUSHI KUGA

BY Toren and McGrady
ATTORNEYS

MIST SEPARATOR

This is a continuation of application Ser. No. 189,344, filed Oct. 14, 1971, now abandoned.

SUMMARY OF THE INVENTION

This invention relates to a mist separator capable of condensing and separating liquid particles (mists) other than dust contained in compressed air continuously, in which a fine fiber layer is provided as the first layer so that even the finest mists are made condensable and separable.

Hitherto, there has been no perfect mist separator which can separate liquid particles (mist) equivalent to tobacco smoke of $0.1 - 0.5\mu$ in diameter or smaller from compressed air.

Various types of mist separators have been so far proposed. For example, some separators employ replaceable adsorbent, some are of condensing type in which multilayer filter media having varied porosity are employed, and some are of the type employing a fine filter layer constructed of ceramics. These mist separators cannot separate fine mists as described above completely. The mist separator according to this invention can separate such mists almost completely.

An object of this invention is to provide a mist separator comprising a fine fiber layer or particle layer formed by overlapping single fibers equivalent to or smaller than fine particles contained in gases and imparting hydrophilic property and affinity for oil to said layer based on capillary condensation, thereby to form fine liquid particles into large drops by forcing them to adhere to the fiber layer continuously.

Now, description will be made on the case where mists are condensed from the adsorbed condition. In case of using a fiber layer formed into the shape of ordinary filter paper by overlapping fine single fibers equivalent in diameter to mists of 0.1 to $0.5\mu$, the clearances between said single fibers will form slits, and these multi-layered fibers can be considered as adsorbing layers. In order to separate mists from air effectively, the Stoke's theory must be satisfied even if air flow rate at the separating layer is increased to a certain degree. In order to satisfy the Stoke's theory, it is necessary to enlarge liquid drops to be separated, because the area of the separating layer is limited. As described above, mists must be adsorbed by or adhere to the fine fiber layer or other adsorbing layer in order to condense fine liquid particles contained in compressed air into large drops. For this purpose, it is preferable that the slits in the fiber layer are equivalent to or smaller than the size of mists.

Especially, as liquid particles in compressed air consists chiefly of oil and oversaturated water, the following difficulty will be encountered when this group of mists is to be adsorbed by conventional adsorbing layer made of active carbon, silica gel or the like. That is, water mists can enter the slits of adsorbent in the form of water particles. However, oil mists can be hardly adsorbed unless they are made large enough (oil particles) to enter the slits of adsorbent. Accordingly, oil mists pass through the clearances between particles of the adsorbent.

This invention differs from the conventional adsorbing layer as described above in that condensation of mists due to adhesion is accomplished without fail because the mist separator according to this invention is so constructed that mists never fail to pass through slits of the fiber layer.

One of the largest factors in mist condensation is that wettability of condensing layer (fiber layer) must be great, that is, hydrophilic property and affinity for oil must be great. It has been made clear that slits should be provided to satisfy the above-described condition.

Further this invention relates to a type of use of a final filter medium layer of condensing type mist separator employing multi-layer filter media for separating and removing fine liquid particles (mists) other than dust contained in compressed gases.

The main filter element of condensing type mist separator is roughly divided into a catching layer, condensing layer and separating layer. The function of the catching layer is to catch fine liquid particles. The condensing layer is designed to condense liquid drops caught and passed from the catching layer in order to make them larger gradually. The function of the separating layer is to separate the liquid drops enlarged to the largest possible size therein from gas flow without allowing drops splashed to be carried away by the gas flow, and then to drop them into a trap. Only when these functions as described above are fully fulfilled, the separator of the type described above can achieve its function completely. Accordingly, in order to improve the performance of the separator of this type it is necessary to research into the development of filter media most suitable for each layer depending on the kind of liquid. This device has been especially directed toward the improvement of types of use, that is, construction, shape, etc. of filter medium which is most suitable for the separating layer.

Generally speaking, the condensing type mist separator makes use of the adhesive force of fine liquid particles to be developed at the time of impact, and therefore gases are forced through a fine filter at a comparatively high speed. For this reason, if all layers including the final separating layer are enclosed in an outer element cylinder as they are in conventional separators, the velocity of gas flow at the outlet will become too high, however large the percentage of voids of the filter medium of this layer is. Thus, it has been quite difficult to completely prevent a small quantity of liquid drops splashed into the gas flow from being scattered.

In other to improve this drawback, according to this invention, the filter medium constituting the separating layer is extended downward from an outer element cylinder by the length almost equal to the radius thereof, as shown by the reference numeral 16 in FIG. 4. Thus, in addition to the cross sectional area of the outer cylinder, the area of gas outlet is increased by the amount corresponding to the area of the exposed lateral side surface of the cylindrical filter medium, thereby to decrease the discharge rate of gas flow substantially. As a result, scattering of splashed drips into the gas flow is significantly improved and the growing rate of liquid drops in the separating layer is further improved. Accordingly, great improvement of the degree of removal and gas treating capability of separators has been achieved.

Stated briefly, this invention resides in the provision of a liquid drop separating device in which the final layer filter medium of a filter element constructed of multilayer media is extended downward from an outer cylinder to increase the area of the gas outlet of said filter element by the amount corresponding to the area of the lateral side surface of the extended medium in addition to the forward front area thereof, thus preventing liquid drops splashed from being carried away by the gas flow when liquid drops are to be separated from the final filter medium into a drain trap.

The most preferred filter medium for the separating layer is plastic fibers or similar fibers (in case of oil mist, for example, vinylidine chloride fibers of 0.2 mm in thickness) having the largest percentage of voids and strength enough to hold liquid in the form of large drops on the surface thereof. Such plastic fibers should allow large drops to slide on the surface at an appropriate speed when blown by the gas flow. At the same time, they should be possessed of strong surface adhesive force with respect to liquid as well as a certain degree of surface roughness. Furthermore, they should be sufficiently high in strength and should have thickness enough to hold large drops. Their percentage of voids should be more than 90%. Such fibers should be twisted and pasted with each other by means of adhesive. The thickness, percentage of voids, material, etc. of such fibers should vary with the kind, viscosity, etc. of liquid.

BRIEF DESCRIPTION OF THE DRAWINGS

The accompanying drawings illustrate two embodiments of this invention, in which.

DESCRIPTION OF THE PREFERRED EMBODIMENTS

An embodiment of this invention will now be described with reference to the accompanying drawings.

Figure 1:
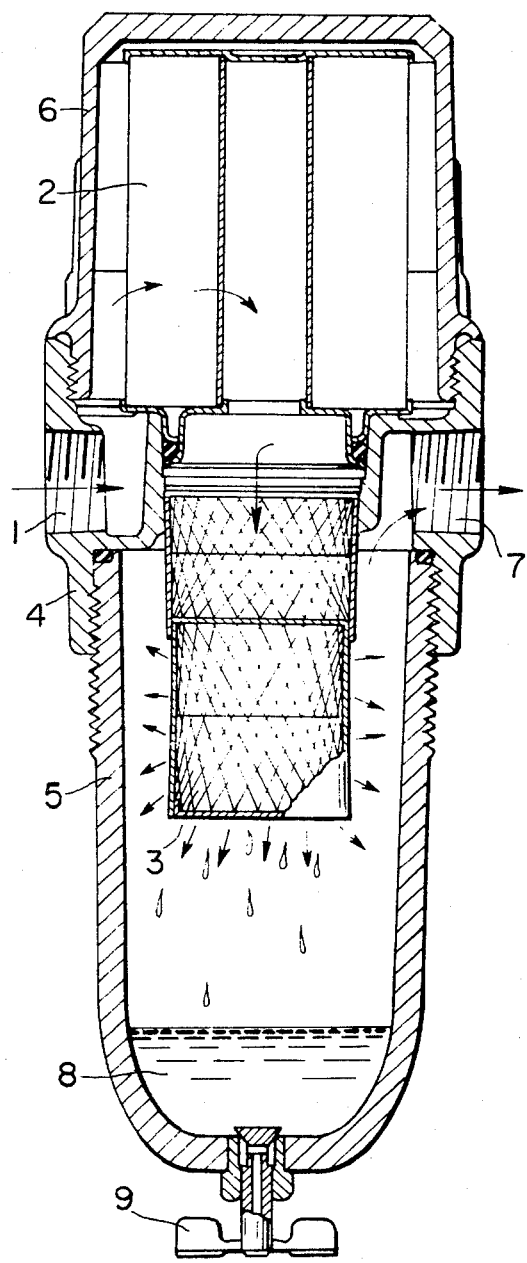
FIG. 1 is a longitudinal sectional view of the first embodiment.

FIG. 1 illustrates, in section, the assembled condition of various layers from mist condensing to separating layer. The compressed fluid admitted through an inlet 1 of a body 4 is passed through a pre-filter 2' (refer to FIG. 2) located at the first layer of a coalescer element 2, where dust and other solids are almost completely removed. Fine particles (dust, solids) are removed by the second layer, that is, a fine fiber layer (or particle layer) (refer to FIGS. 2 and 3). At the same time, mists are condensed. Then, liquid particles enlarged to large drops when they are successively passed through fiber layers having varied porosity are separated by means of a separating layer 3 into gas and liquid. The gas is forced out of an outlet 7 and the liquid is dropped onto a bottom 8 of a case 5. When drain accumulates in certain amount, it is discharged through a drain valve 9. When loading is caused due to dust, the coalescer cartridge 2 is removed for replacement. A cover 6 is so constructed that the cartridge 2 can be easily replaced.

Figure 2:
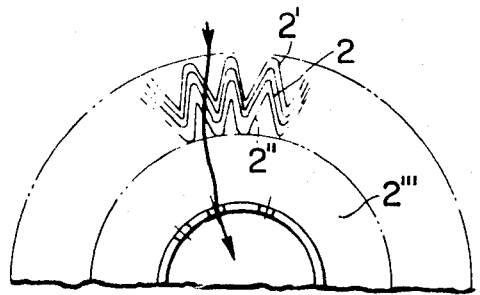
FIG. 2 is a cross sectional view.
Figure 3:
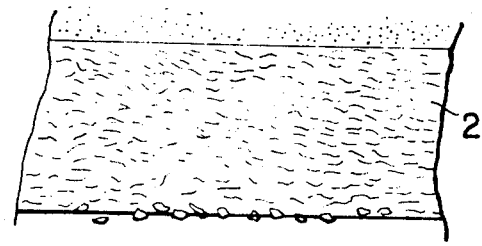
FIG. 3 is a drawing for explaining the action at the filter medium layer (fiber layer)

When mists pass through the fiber layers as described above, the inside of said fiber layers is saturated due to the impact and adhesion of the mists. Since the saturated mists have been condensed to form drops of certain size, they are made larger when they pass through the layers of varied porosity successively. The mists saturated by the fine fiber layer are joined with the mists being passed in succession to form drops and are forced out. Because of capillary condensation, the liquid drops once condensed cannot be returned to the initial state, that is, mists, unless any energy such as temperature or mechanical energy is applied. In the separator having a fine fiber layer as shown in FIG. 2, the resistivity of air passage per unit area of this layer is large, and therefore it is preferable to form this layer into chrysanthemum shape by bending it as shown in FIG. 2 in order to increase the area of air passage. The reference numeral 2' identifies a pre-filter of the fiber layer 2 and the reference numeral 2" designates a supporter for the fine fiber layer 2. However, said pre-filter and supporter can be omitted depending on the condition of use (refer to FIG. 2).

The advantages of the condensing type mist separator according to this invention are that it can be semi-permanently used unless loading due to dust is developed (when loaded, pressure drop becomes large) and that mists can be separated from air continuously. Thus, operating cost is greatly reduced. Furthermore, such a mist separator can be built in a very compact design, thus making it possible to reduce installation cost and to save floor space.

Figure 4:
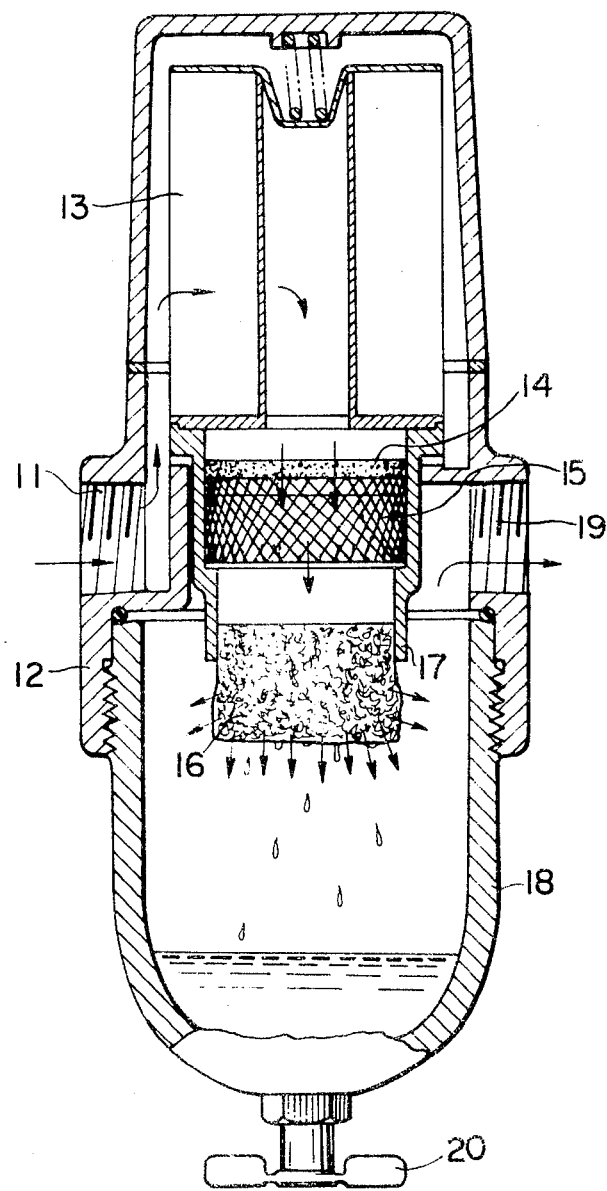
FIG. 4 is a longitudinal sectional view of the second embodiment of the invention.

Second embodiment of this invention is described with reference to FIG. 4 of the drawings. Referring to the drawing, the reference numeral 11 identifies a gas inlet. As shown by the arrow, the gas admitted through said inlet 11 is passed through a pre-filter 13 constructed of filter paper and provided in the upper part of a separator body 12, where dust is removed from the gas. Then, the gas is successively passed through a catching layer 14, a condensing layer 15 and a separating layer 16, which are all provided beneath the pre-filter 13. Thus, liquid drops are separated and accumulate in a trap 18 made of transparent plastics. On the other hand, clean gas is taken out of an outlet 19. The separating layer medium 16 is firmly attached to the inner surface of an outer element cylinder 17 by using adhesive or by any other means. Said filter medium is constructed so that it is extended downward from the outer cylinder 17 by the length almost equal to or more than the radius thereof. The reference numeral 20 designates a hand-operated valve provided at the bottom of the trap 18 for discharging drain.

As described above, according to the construction of this invention, the velocity of the gas flow being passed through the separating layer is decreased, and therefore liquid drops can be completely separated without being scattered by the gas flow.

What is claimed is

1. A mist separator comprising a continuous fine fiber layer formed by overlapping single fibers having a diameter in the range of 0.1 to 0.5 microns which range is the equivalent of the mists to be separated and with said fibers forming slits therebetween having a width not greater than the diameter of said fibers, said fiber layer being formed of a plastic material having a hydrophilic property and an affinity for oil based on capillary condensation so that fine liquid particles are formed into drops by forcing them to adhere to said fine fiber layer continuously, and said fiber layer bent into a pleated chrysanthemum shape to increase the area of air passage therethrough.

2. A mist separator, as set forth in claim 1, characterized therein by a casing having an inlet and an outlet spaced from said inlet, wall means defining a flow path through said casing from said inlet to said outlet, a coalescer element located in said flow path, said coalescer element comprising a pre-filter on the upstream side of said coalescer element, a layer of said overlapping single fibers located on an extending continuously across the downstream side of said pre-filter, and a supporter for said layer of overlapping fine fibers, and a separating layer formed of said overlapping fine fibers located in said flow path downstream of said coalescer element.

3. A mist separator, as set forth in claim 2, wherein said coalescer element is arranged vertically above said separate layer, said inlet located below the upper end of said coalescer element, and the lower end of said separating layer located below said outlet.

4. A mist separator, as set forth in claim 2, wherein said casing comprises a removable cover for replacing said coalescer element.

5. A mist separator comprising a casing having an inlet and an outlet spaced from said inlet, an upwardly oriented outer cylinder located within said casing in the path of flow from said inlet to said outlet, a filter element positioned within said outer cylinder, said filter element comprising an outlet layer filter medium constructed of multi-layer media and located within and extending downwardly from the lower end of said outer cylinder by a length at least approximately equal to the radius of said cylinder for increasing the area of the gas outlet of said filter element by an amount corresponding to the area of the lateral side surface of said downwardly extending medium in addition to the lower area thereof thus preventing liquid drops splashed from being carried by the gas flow when liquid drops are separated for flow downwardly from the lower end of said outlet filter medium, and a pre-filter located in said cylinder above said outlet layer filter medium.

* * * * *